(12) United States Patent
Simonson et al.

(10) Patent No.: US 8,162,331 B2
(45) Date of Patent: Apr. 24, 2012

(54) UTILITY CART ASSEMBLY

(75) Inventors: Joan Simonson, Andover, MN (US);
Kevin Gagnelius, St. Paul, MN (US);
Beverly Becklund, Robbinsdale, MN (US); James M. Graven, Plymouth, MN (US); Troy A. Emter, Zimmerman, MN (US); Terence E. Gobel, Albertville, MN (US)

(73) Assignee: Target Brands, Inc., Minneapolis, MN (US)

(*) Notice: Subject to any disclaimer, the term of this patent is extended or adjusted under 35 U.S.C. 154(b) by 493 days.

(21) Appl. No.: 12/364,454

(22) Filed: Feb. 2, 2009

(65) Prior Publication Data

US 2010/0194064 A1  Aug. 5, 2010

(51) Int. Cl.
*B62B 11/00* (2006.01)
(52) U.S. Cl. ................. 280/47.35; 280/33.991
(58) Field of Classification Search ............ 280/648, 280/33.993, 33.991, 33.992, 47.35, 47.17, 280/652; 224/401, 563, 572, 277; D34/27; D12/133
See application file for complete search history.

(56) References Cited

U.S. PATENT DOCUMENTS

| | | | | |
|---|---|---|---|---|
| 2,472,203 A | * | 6/1949 | Friedmann et al. | 280/652 |
| 2,668,977 A | * | 2/1954 | Reece | 280/47.19 |
| 3,494,631 A | * | 2/1970 | Kreider | 280/47.19 |
| 4,081,205 A | | 3/1978 | Rosenacker | |
| 4,186,859 A | * | 2/1980 | Frankfort et al. | 224/572 |
| 4,376,502 A | * | 3/1983 | Cohen | 280/33.992 |
| 4,487,134 A | | 12/1984 | Foote | |
| 4,560,096 A | * | 12/1985 | Lucas et al. | 280/33.992 |
| 4,643,280 A | | 2/1987 | Hensley | |
| 4,679,818 A | | 7/1987 | Kakavas | |
| 4,702,402 A | * | 10/1987 | Ferri | 280/33.992 |
| 4,901,901 A | | 2/1990 | Reitenour | |
| 4,966,318 A | * | 10/1990 | Dutka | 224/277 |
| 5,004,252 A | | 4/1991 | Kraper | |
| 5,012,966 A | * | 5/1991 | Turner et al. | 280/33.992 |
| 5,072,957 A | | 12/1991 | Graebe, Jr. | |
| 5,182,895 A | * | 2/1993 | Lugo | 224/277 |
| 5,203,578 A | * | 4/1993 | Davidson et al. | 280/33.991 |
| 5,263,578 A | * | 11/1993 | Narvey | 280/33.992 |
| D352,260 S | * | 11/1994 | Adamo | D12/133 |
| 5,417,353 A | * | 5/1995 | Stall | 224/401 |
| 5,494,308 A | * | 2/1996 | Southerland | 280/33.992 |
| D368,566 S | | 4/1996 | Glaeser | |

(Continued)

OTHER PUBLICATIONS

Photographs of Shopping Cart with Additional Storage Components publicly used in Target stores at least as early as 2007.

*Primary Examiner* — Hau Phan
(74) *Attorney, Agent, or Firm* — Griffiths & Seaton PLLC (57) ABSTRACT

A utility cart assembly comprises a shopping cart, a storage unit, and at least one coupling strap. The shopping cart includes a basket and wheels positioned below the basket. The storage unit is coupled to and extends substantially entirely outside the basket. The storage unit defines a first panel positioned adjacent the basket, a second panel opposite the first panel, and a compartment defined between the first panel and the second panel. The second panel defines an opening and the compartment is accessible through the opening. The at least one coupling strap facilitates coupling of the storage unit to the basket. The storage unit is configured to customize the shopping cart for non-consumer use within a retail store. Other product, cards, assemblies and associated methods are also disclosed.

9 Claims, 8 Drawing Sheets

U.S. PATENT DOCUMENTS

| | | | |
|---|---|---|---|
| 5,544,904 A * | 8/1996 | Maher | 280/47.35 |
| 5,553,876 A * | 9/1996 | Trubiano | 280/33.991 |
| 5,918,798 A | 7/1999 | Frahm | |
| 5,961,133 A * | 10/1999 | Perry | 280/33.993 |
| 6,450,513 B1 | 9/2002 | Bernstein | |
| D484,664 S | 12/2003 | Arceta | |
| D484,666 S * | 12/2003 | Caya | D34/27 |
| 6,944,981 B1 | 9/2005 | Garberg et al. | |
| D529,679 S * | 10/2006 | Meyer et al. | D34/27 |
| 7,195,155 B2 | 3/2007 | Garberg et al. | |
| D548,921 S | 8/2007 | Gaddy | |
| D559,043 S | 1/2008 | Peota et al. | |
| 7,374,182 B2 | 5/2008 | Gurley et al. | |
| D583,123 S | 12/2008 | Cassin, III | |
| 7,475,885 B2 * | 1/2009 | Kovath | 280/33.992 |
| 2002/0084628 A1 * | 7/2002 | Van Horn et al. | 280/648 |
| 2006/0049591 A1 | 3/2006 | Pennell | |
| 2007/0273113 A1 | 11/2007 | Muir | |

* cited by examiner

UTILITY CART ASSEMBLY

BACKGROUND OF THE INVENTION

Retail consumers commonly use shopping carts to facilitate the transport of retail products from display shelves to point-of-sale terminals and even to the consumer's vehicle, etc. As such, retail establishments often have a plurality of shopping carts on hand to assist consumers shopping in their stores.

In order to communicate sales information to retail consumers and/or to advertise particular products in retail establishments, signs are provided and, in many circumstances, are integrated into retail product displays on a sales floor of the retail establishment. Signs and labels within retail establishments are continually updated when products are moved within or initially set within stores and/or to merely provide visual variety to consumers. Oftentimes, sign and label changes within retail establishments require any number of items, e.g., tools, fixtures, labels, signs, etc., that must be located in a back room of the retail establishment and transported to the area of the retail establishment where the new sign will be installed or updated.

It is easy for the retail employee to forget or fail to anticipate all the tools and other devices needed to install or update a sign. The lack of planning and/or occurrence of unforeseen circumstances, which may require additional tools or devices, often result in the retail employee having to make multiple trips between the back room and the desired sign area of the retail establishment to install or update a sign. In some instances the mere volume of items needed for a sign install or update, typically requires the retail employee to make multiple trips between the back room and the retail display. Consequently, the time required for installing or updating a sign increases along with the general cost of manpower for installing or updating the sign.

SUMMARY OF THE INVENTION

One aspect of the present invention relates to a utility cart assembly including a shopping cart, a storage unit, and at least one coupling strap. The shopping cart includes a basket and wheels positioned below the basket. The storage unit is coupled to and extends substantially entirely outside the basket. The storage unit defines a first panel positioned adjacent the basket, a second panel opposite the first panel, and a compartment defined between the first panel and the second panel. The second panel defines an opening and the compartment is accessible through the opening. The at least one coupling strap facilitates coupling of the storage unit to the basket. The storage unit is configured to customize the shopping cart for non-consumer use within a retail store. Other related products, assemblies and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Embodiments of the present invention are configured to provide a mobile utility cart assembly configured for holding implements of various sizes for a general or specified purpose. In one example, the mobile utility cart assembly includes a conventional or other shopping cart customized with one or more external and/or internal storage units each configured to provide compartmentalized storage, a work surface, etc. As such, the shopping cart is configured for a specific use as opposed to the typical shopping use of the shopping cart. For example, the resultant utility cart assembly provides a number of various sized compartments for receiving signing and labeling materials and/or a work surface configured to selectively cover one or more of the various sized compartments. Other variations of the utility cart assembly described herein are contemplated and will be appreciated by those of skill in the art.

Figure 1:
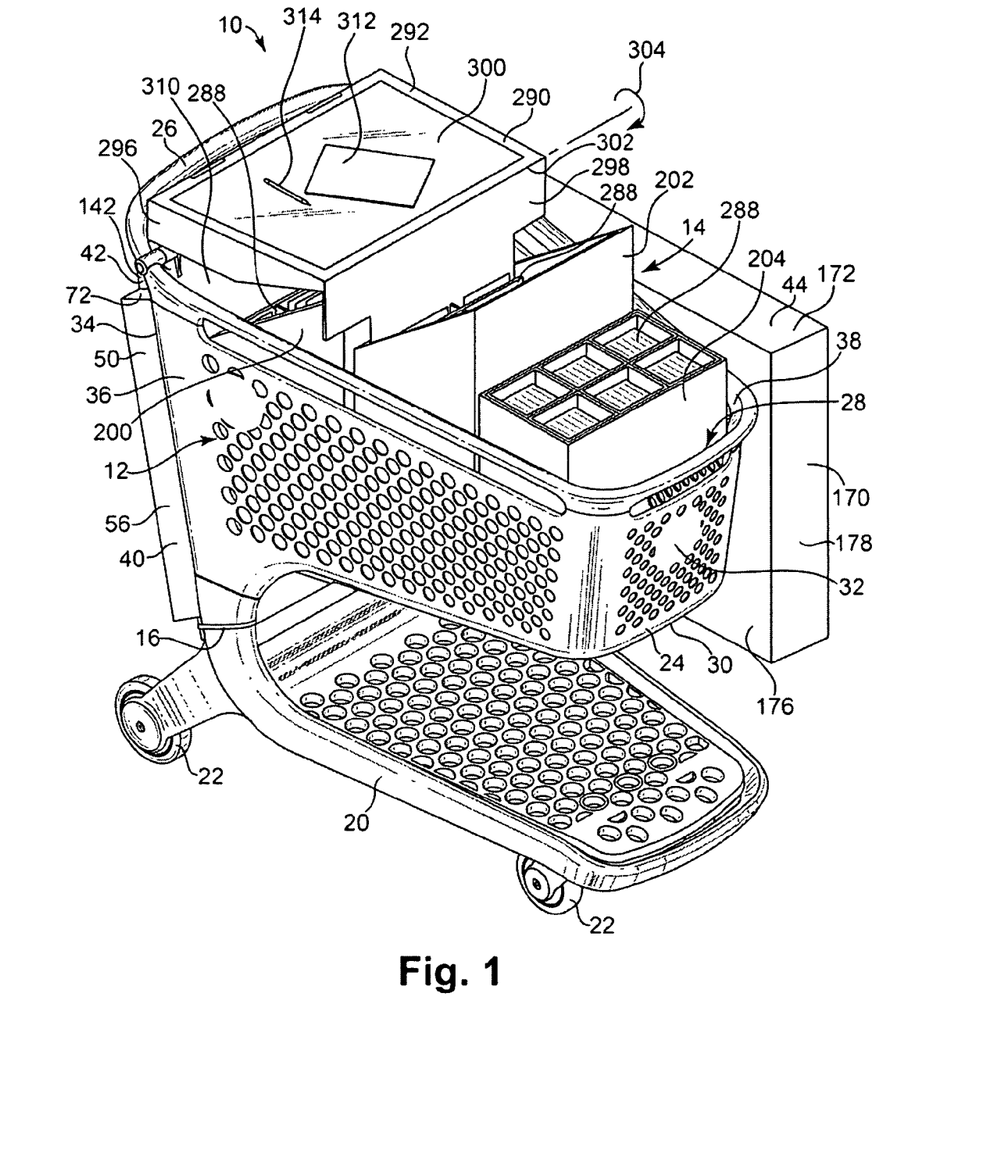
FIG. 1 is a front, perspective view illustration of a utility cart assembly, according to one embodiment of the present invention.
Figure 2:
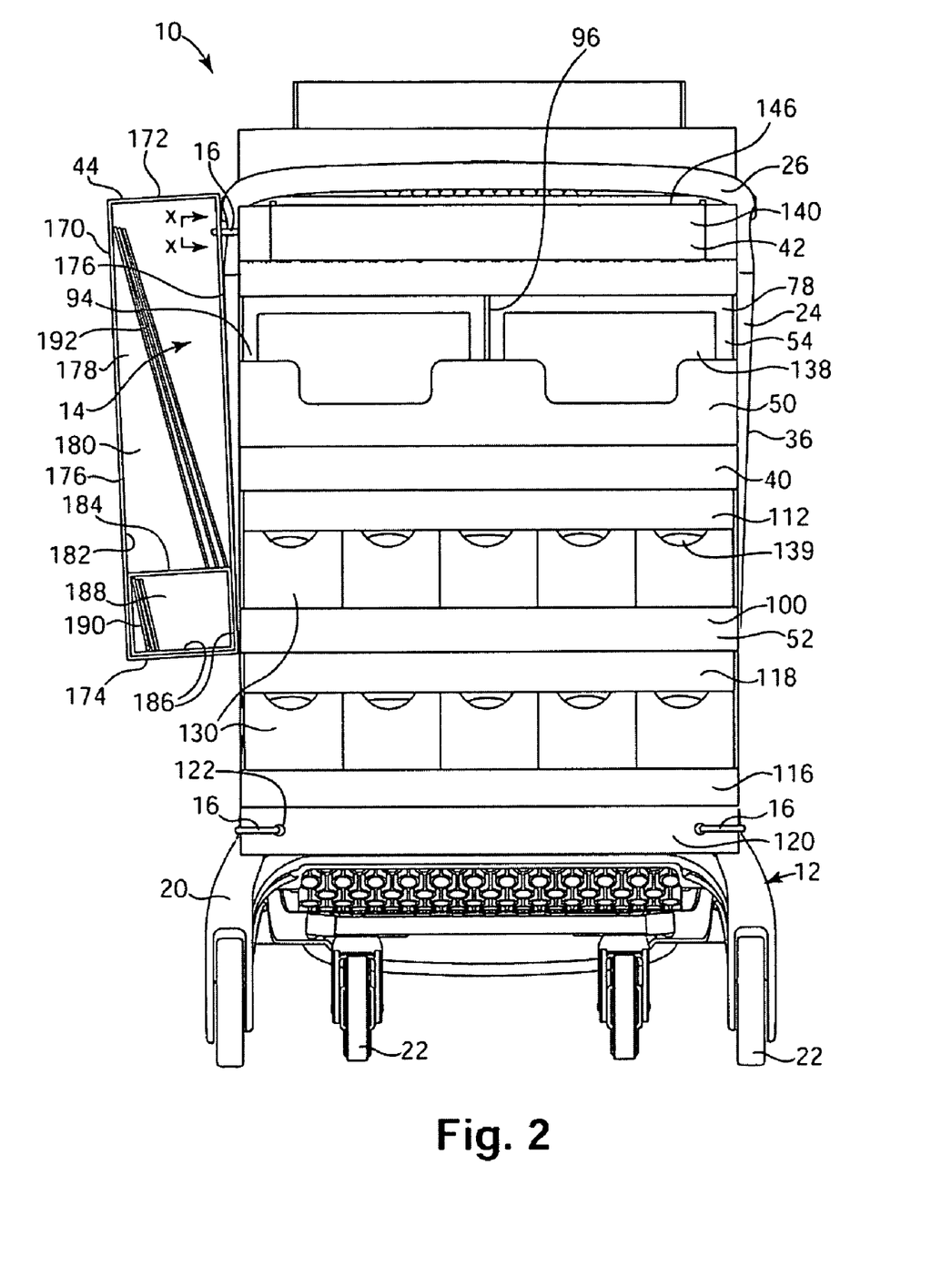
FIG. 2 is a rear view illustration of the utility cart assembly of FIG. 1, according to one embodiment of the present invention.

Turning to FIGS. 1 and 2, one embodiment of a utility cart assembly 10 used, for example, in a retail environment or establishment is illustrated. In one example, utility cart assembly 10 (or other mobile work station) includes a shopping cart 12 and a plurality of auxiliary storage sections or units 14 associated with shopping cart 12, for instance, maintained within and/or coupled with shopping cart 12 with coupling devices 16. Shopping cart 12 is any suitable shopping cart, such as a conventional or other shopping cart generally available at retailers for aiding consumers in transporting products through and, in some instances, outside of the retail establishment (e.g., store). The plurality of auxiliary storage units 14 transform the general functionality of shopping cart 12 for a more specific use, for example, for assisting employees in installing and/or updating signage for a retail display. Other specific uses that utilize the compartmentalized storage of utility cart assembly 10 are also contemplated, e.g., retail fixture assembly, retail display restocking, and other suitable uses.

One example of shopping cart 12 includes a base 20, wheels 22, a basket 24, and a handle 26. Base 20 is formed near a bottom of shopping cart 12 and is coupled to wheels 22 configured to contact a floor allowing relatively easy movement of shopping cart 12 over the floor. Basket 24 is spaced above base 20 and defines a chamber or storage area 28 therein. More specifically, basket 24 defines a basket bottom wall 30, a basket front wall 32, a basket rear wall 34 and basket sidewalls 36. Each of front wall 32, rear wall 34 and sidewalls 36 extend upwardly from bottom wall 30, and, in one example, are all formed of a continuously extending wire or plastic frame. An open top 38 of basket 24 provides access to storage area 28. Handle 26 extends upwardly and/or rearwardly from basket rear wall 34 to facilitate a user in driving or otherwise manipulating shopping cart 12.

In one embodiment, the plurality of auxiliary storage units 14 includes external sections such as first external unit 40, second external unit 42, and third external unit 44 pictured in FIGS. 1 and 2 coupled to shopping cart 12 outside of basket 24 (i.e., not in storage area 28). In one example, each of first external unit 40, second external unit 42, and third external unit 44 is formed of a renewable substantially planar material (e.g., paper, cardboard, or chipboard) while other suitable materials are equally acceptable.

Figure 3:
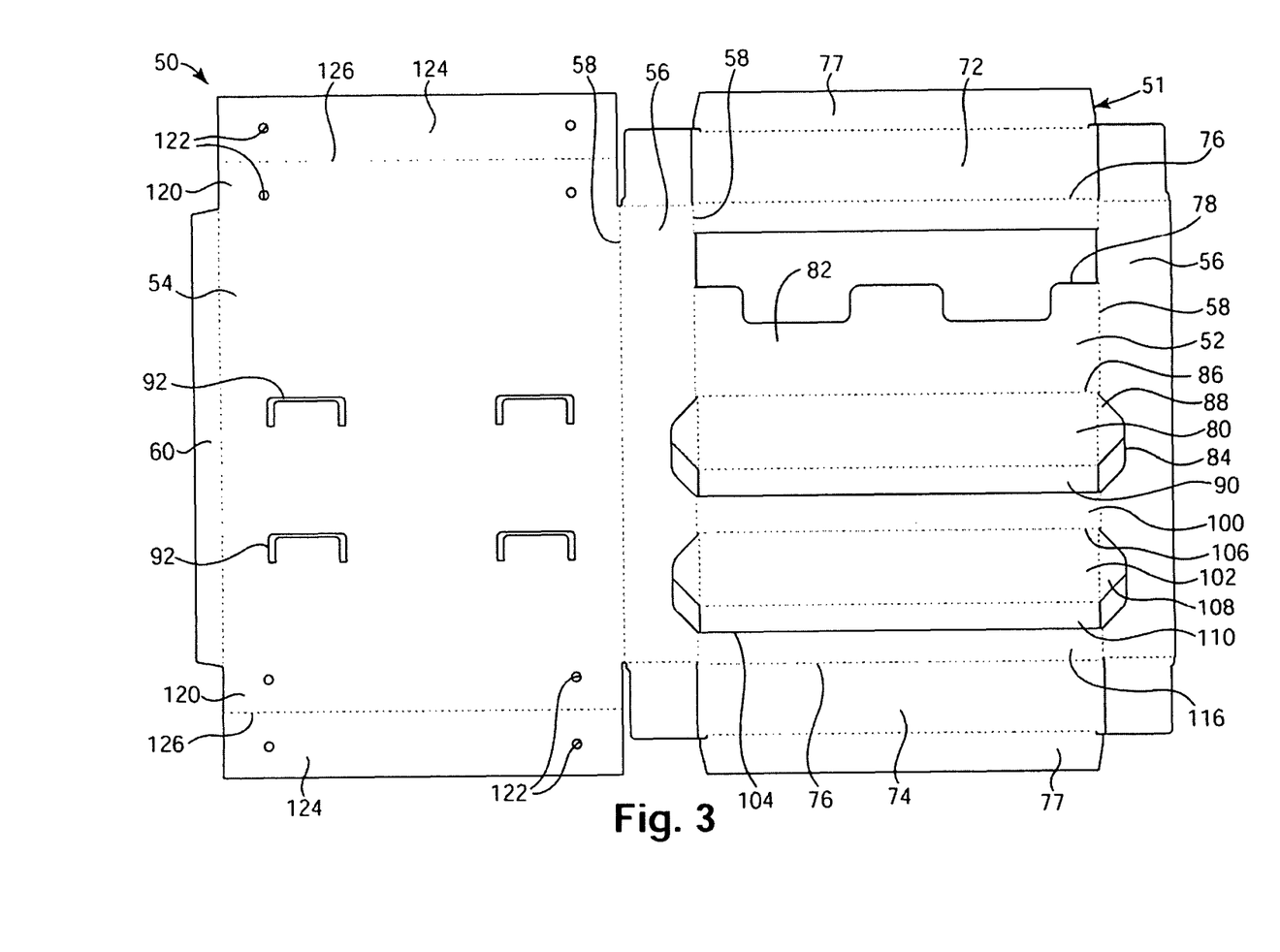
FIG. 3 is a front view illustration of an unfolded blank for forming a storage unit of the utility cart assembly of FIG. 1, according to one embodiment of the present invention.
Figure 4:
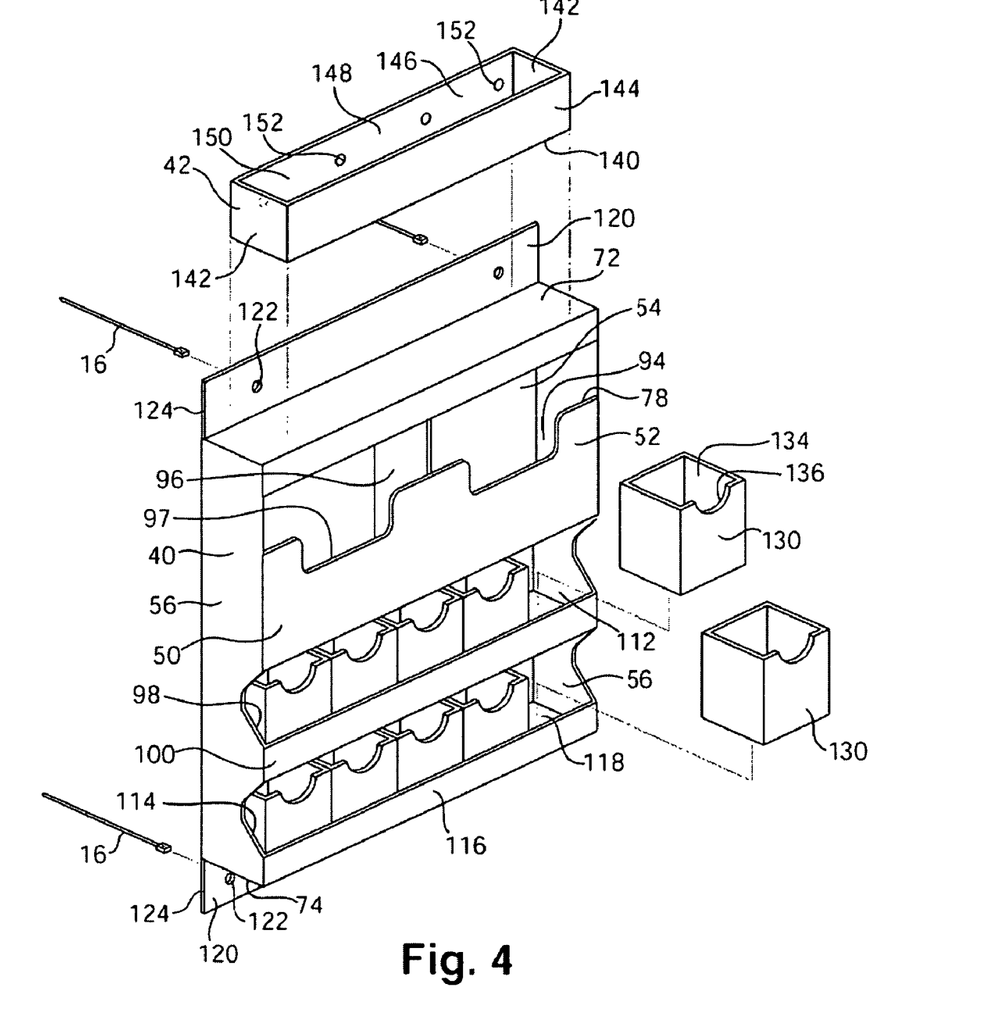
FIG. 4 is a partially exploded, front perspective view illustration of auxiliary storage units and connection devices of the utility cart assembly of FIG. 1, according to one embodiment of the present invention.

First external unit 40 includes a main body 50 defining various compartments for storing useful goods. Additionally referring to FIGS. 3 and 4, in one example, main body 50 of first external unit 40 is formed from a planar blank 51 (FIG. 3) of material folded or otherwise manipulated into the desired three-dimensional form. For instance, referring to the example of FIG. 3, blank 51 defines a rear panel 52, a front panel 54, and side panels 56 separated from each other by fold lines 58. When folded, rear panel 52 and front panel 54 extend opposite and substantially parallel to one another while side panels 56 each extend between rear panel 52 and front panel 54 parallel to one another, for example, as illustrated in FIG. 4. In one example, a side coupling tab 60 extends from and up and down a side edge of front panel 54 and, when blank 51 is folded, interfaces with one of side panels 56 (e.g., is adhered or otherwise attached thereto) maintaining main body 50 at least partially in its assembled, e.g., non-folded, position.

In one embodiment, planar blank 51 additionally defines a top wall 72 and a bottom wall 74. In one example, top wall 72 extends from a top edge of rear panel 52, and bottom wall 74 extends from a bottom edge of rear panel 52. Both top wall 72 and bottom wall 74 are folded back about respective fold lines 76 at their borders with rear panel 52 toward front panel 54 to extend substantially perpendicularly with respect to rear panel 52, front panel 54, and, in one embodiment, side panels 56. In one example, top and bottom coupling tabs 77 extend from and are folded relative to top wall 72 and bottom wall 74, respectively, to interface with and, in one example, to be adhered to front panel 54 once so adhered top and bottom coupling tabs 77 help maintain first external unit 40 in its folded and assembled position. In one example, coupling tabs 77 each extend substantially along an entire width of the respective top wall 72 and/or bottom wall 74.

Once main body 50 of first external unit 40 is folded into a three-dimensional box form (see, e.g., FIG. 3), then rear panel 52 is spaced from front panel 54 a distance equal to a depth of each side panel 56. In one embodiment, rear panel 52 defines a top compartment cutout or opening 78 extending across a substantial portion of and, in one example, is substantially coextensive with an entire width of rear panel 52. Top compartment opening 78 may be sized and shaped in any suitable manner. In one embodiment, rear panel 52 at least partially defines top compartment bottom wall 80 spaced from and positioned below top compartment opening 78 to define a top compartment rear wall 82. Bottom wall 80 has a width substantially equal to or greater than a width of top compartment opening 78. Bottom wall 80 is defined between and directly bordered by cuts 84 and fold line 86 in rear panel 52 and, in one example, in side panels 56. Fold line 86 is substantially linear and extends across the width of rear panel 52. To continue assembly of main body 50, bottom wall 80 is folded forwardly and upwardly along fold line 86 to extend substantially perpendicular to rear wall 82 of rear panel 52.

In one example, bottom wall 80 defines side flaps 88 at opposite ends thereof. In one embodiment, side flaps 88 extend into and, therefore, are partially defined by opposite side panels 56. Side flaps 88 fold upwardly, or alternatively downwardly, from bottom wall 80 to be adhered or otherwise coupled to side panels 56 of main body 50. Similarly, in one example, bottom wall 80 defines a front flap 90 opposite fold line 86. Front flap 90 is folded to extend substantially perpendicularly to the primary portion of bottom wall 80. When bottom wall 80 is folded into position, front flap 90 extends parallel and is positioned directly adjacent to front panel 54 and, in one example, is adhered thereto. In one example, rather than or in addition to being adhered to front panel 54, a portion of front flap 90 is placed through slots 92 defined in front panel 54. For instance, in one embodiment, slots 92 each have an inverted U-shape to receive and hold the respective portion of front flap 90. To facilitate receipt of front flap 90, slots 92 are positioned on front panel 54 at a height to correspond with the final folded height of front flap 90 on rear panel 52.

Once front flap 90 is coupled with front panel 54 and/or side flaps 88 are coupled with sidewalls 56, bottom wall 80 is secured in place to extends from rear panel 52 to front panel 54 and between opposite side panels 56. Once so assembled, a top compartment 94 (see, e.g., FIG. 4) is defined between top compartment rear wall 82, front panel 54 and bottom wall 80. In one example, one or more top compartment dividers 96 (FIGS. 2 and 4) may be inserted into top compartment 94, such as to extend between front panel 54 and rear panel 52 to divide top compartment 94 into two or more smaller chambers. In one example, top compartment rear wall 82 defines cutouts 97 to facilitate a user in accessing items contained in top compartment 94.

By folding bottom wall 80 upwardly, a mid-compartment opening 98 (FIGS. 2 and 4) is formed at least partially by rear panel 52 as a void left at the previous position of bottom wall 80 just below top compartment rear wall 82. In one example, mid-compartment opening 98 is partially defined by side panels 56 due to the original position of side flaps 88, which extended into side panels 56. Below mid-compartment opening 98 (i.e., opposite top compartment opening 78), rear panel 52 defines a mid-compartment rear wall or rear lip 100 along the same plane as top compartment rear wall 82. Just below mid-compartment rear wall 100, rear panel 52 defines a mid-compartment bottom wall 102 spaced from and positioned below mid-compartment opening 98. In one embodiment, bottom wall 102 is sized and shaped similar to bottom wall 80 and, in one example, is laterally aligned with bottom wall 80. As such, bottom wall 102 is defined between and directly bordered by cuts 104 and fold line 106 in rear panel 52 where cuts 104 and fold line 106 are similar to cuts 84 and fold line 86 described above. To continue assembly of main body 50, bottom wall 102 is folded forwardly and upwardly along fold line 106 to extend substantially perpendicular to rear wall 100 of rear panel 52 and to front panel 54.

In one example, bottom wall 102 defines side flaps 108 and a front flap 110, which are respectively similar in design and function to side flaps 88 and front flap 90 described above. As such, bottom wall 102 is folded up along fold line 106 and is secured in place via interaction between side flaps 108 and side panels 56 and between front flap 110 and front panel 54

(e.g., with adhesive and/or via interaction with corresponding slots 92). Once front flap 110 is coupled with front panel 54 and/or side flaps 108 are coupled with side panels 56, bottom wall 102 is secured in place to extend from rear panel 52 to front panel 54 and between opposite side panels 56. Once so assembled, an intermediate mid-compartment 112 (see, e.g., FIG. 4) is defined between mid-compartment rear wall 100 of rear panel 52, front panel 54, and bottom wall 80.

By folding mid-compartment bottom wall 102 upwardly, a bottom compartment opening 114 (FIGS. 2 and 4) is formed by rear panel 52 and, in one example, side panels 56 as a void left at the previous position of mid-compartment bottom wall 102 just below mid-compartment rear wall 100. Below bottom compartment opening 114 (i.e., opposite top compartment opening 78), rear panel 52 defines a bottom compartment rear wall or rear lip 116 along the same plane as top compartment rear wall 82 and mid-compartment rear wall 100. A bottom compartment 118 is defined between bottom compartment rear wall 116, front panel 54 and side panels 56. The lower bounds of bottom compartment 118 are defined by bottom wall 74 described above.

In one embodiment, top and bottom coupling tabs 120 are respectively defined at the top and bottom of front panel 54. Coupling tabs 120 are positioned and shaped to extend up or down respectively from a remainder of front panel 54 such that coupling tabs 120 extends outwardly beyond rear panel 52 when it is folded to interface, etc. with front panel 54. In one example, each coupling tab 120 defines apertures 122, for example, near corners thereof, for receiving coupling devices 16 as will be further described below. In one embodiment, a reinforcement panel 124 extends away from each coupling tab 120 and is separated from the corresponding coupling tab 120 by a fold line 126. Reinforcement panel 124 is folded either clockwise or counterclockwise about the respective fold line 126 to align with and reinforce the corresponding coupling tab 120. In one embodiment, reinforcement panel 124 defines apertures 122 to correspond with and coaxially align with one another when each reinforcement panel 124 is folded to coextend with an associated coupling tab 120.

In one embodiment, storage cartons 130 are provided to further facilitate storage of components within first external unit 40. Each storage carton 130 defines a storage chamber 134 configured to receive and selectively store items and is sized and shaped to fit within one or both of mid-compartment 112 and lower compartment 118. In particular, each storage carton 130 received by mid-compartment 112 is supported on bottom wall 102 and a lower portion thereof is snuggly held in place between front panel 54 and mid-compartment rear wall 100. Similarly, each storage carton 130 received by lower compartment 118 is supported on mid-compartment bottom wall 102 and a lower portion thereof is snuggly held in place between front panel 54 and bottom compartment rear wall 116. Storage cartons 130 are accessible and removable from the respective mid-compartment 112 or bottom compartment 118 by lifting and pulling each storage carton 130.

In one example, each storage carton 130 defines a cutout portion 136, for instance, along a top edge thereof to facilitate a user in one or both of grasping the respective storage carton 130 within mid-compartment 112 or lower compartment 118. Cutout portion 136 also facilitates a user viewing the contents of the respective storage cartons 130. It should be recognized that cutout portion 136 may be eliminated and/or other components may be added to storage carton 130 to facilitate its use. Suitable items, which are generally indicated in FIG. 2 at 138 and 139, are stored in storage cartons 130 (and, thereby, within mid-compartment 112 and bottom compartment 118) and within top compartment 94 as will be apparent to those of skill in the art. In one example, such as where utility cart assembly 10 is adapted for signing, items 138 and 139 may include any of the following items if they are suitably sized: instruction sheets, fixtures, plastic sign holders, clips, signs (e.g., price signs), labels, writing utensils, tape measure, chip signs, screw drivers, sign pockets, planograms, batteries, peg hooks, tools (e.g., screwdriver tape measure) and other miscellaneous items as will be apparent to those of skill in the art upon reading the current application.

Referring to FIG. 4, in one example, second external unit 42 includes a bottom wall 140, sidewalls 142 extending upwardly from bottom wall 140 opposite one another, a rear wall 144 extending upwardly from bottom wall 140 between opposite sidewalls 142, and a front wall 146 extending upwardly from bottom wall 140 between sidewalls 142 opposite rear wall 144. As such, second external unit 42 has a rectangular box shape and defines a storage area 148 between bottom wall 140, sidewalls 142, rear wall 144, and front wall 146. In one example, storage area 148 is open to a top 150 of second external unit 42 positioned opposite bottom wall 140. In one embodiment, the elongated shallow nature of storage area 148 makes storage area 148 ideal for storing tools (e.g., a screwdriver, tape measure, and/or hammers), securement means (e.g., tape and/or screws), and/or writing utensils.

In one embodiment, apertures 152 are defined through, for example, front wall 146 to facilitate attachment of second external unit 42 to shopping cart 12 (FIGS. 1 and 2). In one embodiment, second external unit 42 is sized and shaped to fit immediately adjacent to and on top of top wall 72 of first external unit 40 as illustrated, for example, in FIG. 4. In one example, when placed on top wall 72, one or more of apertures 152 of second external unit 42 align with one or more apertures 122 of first external unit 40 such that both first and second external units 40 and 42 can be coupled to shopping cart 12 using a similar coupling device(s) 16 thread through both of apertures 152 and 122 as will be further described below.

In one embodiment, second external unit 42 is specifically sized and shaped to fit within the outer bounds of handle 26 of shopping cart 12. As such, open top 150 of second external unit 42 is accessible through a space between handle 26 and basket rear wall 34 as will be apparent to those of skill in the art upon reading this application. Placement of second external unit 42 between handle 26 and basket 24 also facilitates coupling of second external unit 42 to shopping cart 12. Use of cable ties or other similar coupling devices 16 for attaching first external unit 40 and second external unit 42 to shopping cart 12 allows utility cart assembly 10 to be easily broken down without disabling shopping cart 12 for future more conventional use. Rather, cable ties can simply be cut releasing first and second external units 40 and 42 from shopping cart 12.

Referring to FIGS. 1 and 2, in one embodiment, third external unit 44 is provided as an addition or alternative to first external unit 40 and/or second external unit 42. In one example, third external unit 44 includes a first member 170 defining a top wall 172, a bottom wall 174, sidewalls 176, and front wall 178. Top wall 172 is positioned opposite bottom wall 174, and sidewalls 176 extend between top wall 172 and bottom wall 174 opposite one another. In one embodiment, top wall 172, bottom wall 174 and sidewalls 176 all have a substantially similar width that, in one example, is similar to a width of a basket sidewall 36 of shopping cart 12 as measured from the front to the back of shopping cart 12. In one example, first member 170 is coupled to shopping cart 12 to extend along an outside one of sidewalls 36 of basket 24.

As best illustrated in FIG. 2, a storage area or chamber 180 is defined within first member 170 and, in one example, is configured for storage of relatively large fixtures, signs, tools, etc. For instance, in one embodiment, the height of and width of storage chamber 180 is at least twice the height and width (or any other dimension) of the top compartment 94 of first external unit 40, even if divider 96 is ignored and top compartment 94 is considered as a whole. Storage chamber 180 is accessible via a rear opening 182 of first member 170 defined opposite and sized similarly to front wall 178.

In one example, an insert 184 is placed in storage chamber 180 to divide storage chamber 180 into smaller compartments. More specifically, in one embodiment, insert 184 is a rectangular box structure with four walls 186 sized to fit within storage chamber 180 supported by bottom wall 174. In one example, insert 184 has a front-to-back dimension similar to or slightly smaller than bottom wall 174 and sidewalls 176. Insert 184 defines an elongated cavity 188 open toward rear opening 182 as illustrated in FIG. 2. As such, elongated tools, labels, signs, fixtures, clips, sign holders, and other suitable items, which are generally illustrated in FIG. 2 at 190, with relatively small cross-sections can be slid into cavity 188 through rear opening 182 while larger items generally indicated in FIG. 2 at 192 can be slid into storage chamber 180 through rear opening 182.

Figure 9:
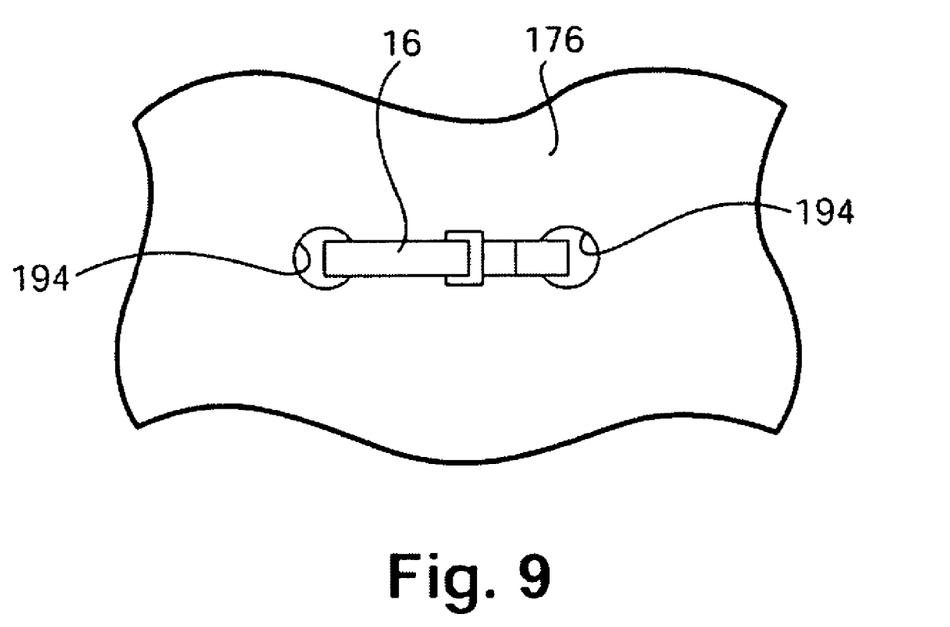
FIG. 9 is a cross-sectional view illustration taken along the line X-X in FIG. 2, according to one embodiment of the present invention.

Additionally referring to the cross-sectional view of FIG. 9, in one example, sidewall 176 of first member 170 defines coupling apertures 194. In one example, one or more coupling device 16, e.g., a cable tie, string, chain, rope, bungee cord, or any other suitable connection device, is thread through coupling apertures 194 to interface with and/or wrap around a portion of shopping cart 12 (e.g., through holes in the wire or plastic frame of shopping cart 12) to couple third external unit 44 to shopping cart 12. Use of cable ties or other similar coupling device 16 allows the assembly to be easily broken down without disabling shopping cart 12 for future more conventional use. Rather, cable ties can simply be cut releasing third external unit 44 from shopping cart 12. Other suitable coupling methods will be apparent to those of skill in the art upon reading the present application. Although described as separate external units 40, 42 and 44, one of ordinary skill in the art should recognize that components and/or features of external units 40, 42 and 44 may be combined, used as alternatives to one another, etc. in any suitable manner.

Generally referring to FIG. 1, in one embodiment, the plurality of auxiliary units 14 also includes internal units sized and shaped to fit within basket 24, for example, a first internal unit 200, a second internal unit 202, and a third internal unit 204. First internal unit 200 is sized and shaped to fit within basket 24 nearest basket rear wall 34. Additionally referring to FIG. 5, first internal unit 200 includes a rear wall 210, a front wall 212 opposite rear wall 210, and sidewalls 214 opposite one another and each extending between rear wall 210 and front wall 212. Rear wall 210, front wall 212 and sidewalls 214 collectively define a bottom edge 216 and an opposite top edge 218 and form a storage cavity 220 therebetween.

Figure 5:
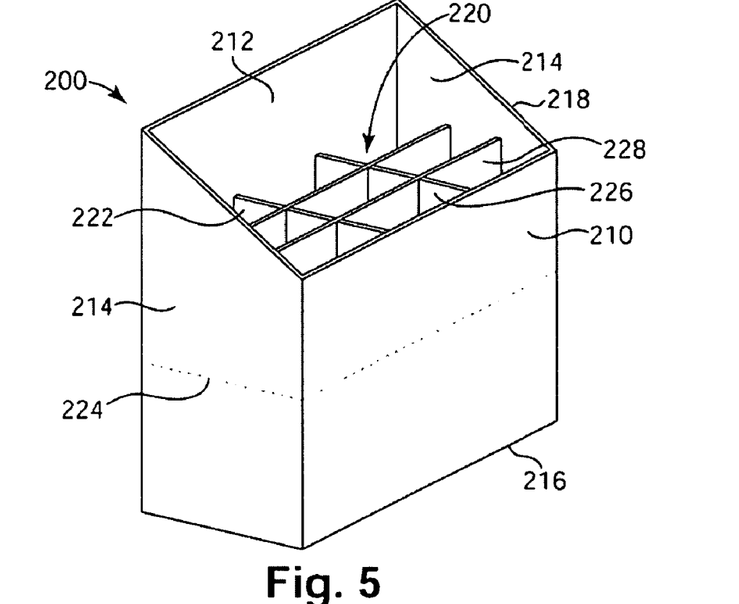
FIG. 5 is a front perspective view illustration of a storage unit of the utility cart assembly of FIG. 1, according to one embodiment of the present invention.

In one example, bottom edge 216 is entirely formed in a single plane such that bottom edge 216 is flat and configured to fit on basket bottom wall 30 of shopping cart 12 in a stable manner. In one embodiment, rear wall 210 is shorter than front wall 212 such that portions of top edge 218 defined by sidewalls 214 angle upwardly from rear wall 210 to front wall 212. The angled orientation of sidewalls 214 increases the stability and rigidity of first internal unit 200. In one example, rear wall 210, front wall 212 and sidewalls 214 are all formed from a single cardboard or other suitable planar material blank. In one example, at least portions of rear wall 210, front wall 212 and sidewalls 214 are reinforced and formed with two layers of cardboard or the other suitable material as will be apparent to those of skill in the art upon reading the present application.

In FIG. 5, first internal unit 200 is illustrated as including dividers 222 according to one embodiment of the present invention. Dividers 222 include a lower wall 224 (generally indicated with dashed lines in FIG. 5), front-to-back dividers 226, and side-to-side dividers 228 to generally break storage cavity 220 into smaller compartments to facilitate organization and/or separation of different types and sizes of items maintained. In one embodiment, the different dividers 222 may be separately formed, while, in one embodiment, front-to-back dividers 226 and/or side-to-side dividers 228 are integrally formed with lower wall 224 and are folded into position as will be apparent to those of skill in the art upon reading the present application.

As shown in FIG. 1, in one embodiment, second internal unit 202 is sized and shaped to fit within basket 24 just in front of first internal unit 200. Additionally referring to FIG. 6, second internal unit 202 includes a rear wall 240, a front wall 242 opposite rear wall 240, and sidewalls 244 opposite one another and each extending between rear wall 240 and front wall 242. Rear wall 240, front wall 242 and sidewalls 244 collectively define a bottom edge 246 and a top edge 248 and form a storage cavity 250 therebetween.

Figure 6:
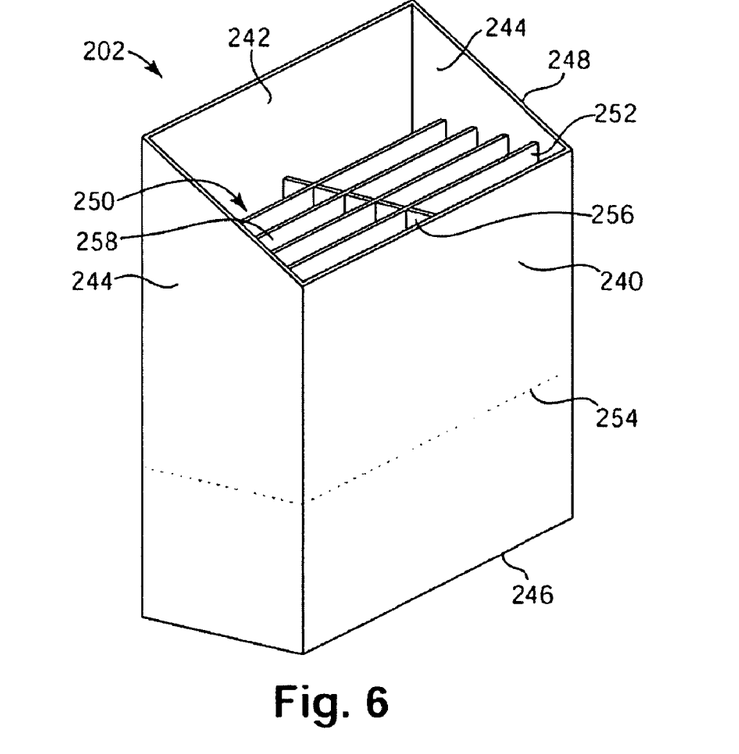
FIG. 6 is a front perspective view illustration of a storage unit of the utility cart assembly of FIG. 1, according to one embodiment of the present invention.

In one example, bottom edge 246 is entirely formed in a single plane such that bottom edge 246 is flat and configured to fit on basket bottom wall 30 of shopping cart 12 in a stable manner. In one embodiment, rear wall 240 is shorter than front wall 242 such that portions of top edge 248 defined by sidewalls 244 angle upwardly from rear wall 240 to front wall 242. The angled orientation of sidewalls 244 increases the stability and rigidity of second internal unit 202. In one example, rear wall 240, front wall 242 and sidewalls 244 are all formed from a single cardboard or other suitable planar material blank. In one example, at least portions of rear wall 240, front wall 242 and sidewalls 244 are reinforced and formed with two layers of cardboard or the other suitable material as will be apparent to those of skill in the art upon reading this application.

In FIG. 6, second internal unit 202 is illustrated as including dividers 252 according to one embodiment of the present invention. Dividers 252 include a lower wall 254 (generally indicated with dashed lines in FIG. 6), front-to-back dividers 256, and side-to-side dividers 258 to generally break storage cavity 250 into smaller compartments to facilitate organization and/or separation of different types and sizes of items maintained therein. In one embodiment, the different dividers 252 are separately formed. In one embodiment, front-to-back dividers 256 and/or side-to-side dividers 258 are integrally formed with lower wall 254 and are folded into position as will be apparent to those of skill in the art upon reading the present application. In one embodiment, second internal unit 202 is generally taller than first internal unit 200. As such, the tops of first and second internal units 200 and 202 stored in first and second internal units 200 and 202 is generally tiered for ease of viewing by the user. In one embodiment, second internal unit 202 is configured to hold longer items than first internal unit 200. In one embodiment, the position of lower walls 224 and 254 in first internal unit 200 and second internal unit 202, respectively, form storage cavities 220 and 250 with similar heights.

As shown in FIG. 1, in one embodiment, third internal unit 204 is sized and shaped to fit within basket 24 nearest basket rear wall 34 (i.e., behind first and second internal units 200 and 202). Additionally referring to FIG. 7, third internal unit 204 includes a rear wall 270, a front wall 272 opposite rear wall 270, and sidewalls 274 opposite one another and each extending between rear wall 270 and front wall 272. Rear wall 270, front wall 272 and sidewalls 274 collectively define a bottom edge 276 and a top edge 278 and to form a storage cavity 280 therebetween.

Figure 7:
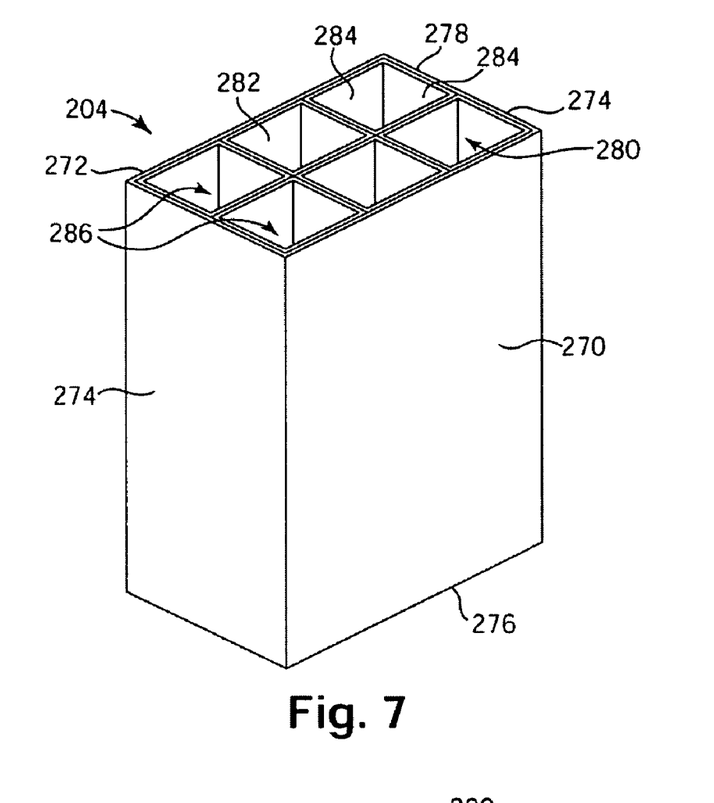
FIG. 7 is a front perspective view illustration of a storage unit of the utility cart assembly of FIG. 1, according to one embodiment of the present invention.

In one example, bottom edge 276 is entirely formed in a single plane such that bottom edge 276 is flat and configured to fit on basket bottom wall 30 of shopping cart 12 in a stable manner. In one embodiment, rear wall 270 and front wall 272 are substantially the same height as one another. In one example, rear wall 270, front wall 272 and sidewalls 274 are all formed from a single cardboard or other suitable planar material blank. In one example, at least portions of rear wall 270, front wall 272 and sidewalls 274 are reinforced and formed with two layers of cardboard or the other suitable material.

In FIG. 7, third internal unit 204 is illustrated as including dividers 282 according to one embodiment of the present. In one example, each divider 282 includes four sidewalls 284 and is generally square or rectangular in shape. As illustrated, each divider sidewall 284 has a similar height as sidewalls 274. It should be understood that in one embodiment, sidewalls 284 may be shorter than sidewalls 274 such that a bottom (not shown) spaced from bottom edge 276 may be included. In one embodiment, an even number of dividers 282, for example six dividers 282 are provided and are placed side to side in storage cavity 280 to divide storage cavity 280 into six smaller rectangular cavities 286 each formed within one of dividers 282. Although first, second, and third internal units 200, 202, and 204 are described with particular constructions, it should be understood that the various constructions described may generally be substituted for or combined with one another and/or other suitable constructions may be used as will be apparent to those of skill in the art upon reading the current application.

Cavities 220, 250, 280, and 286 are configured to maintain any items, implements, etc. for the particular use the utility cart assembly 10 is configured to support. In one example, such as where utility cart assembly 10 is adapted for signing, cavities 220, 250, 280, and 286 selectively store items generally indicated at 288 in FIG. 1 such as instruction sheets, fixtures, plastic sign holders, clips, signs (e.g., price signs), labels, writing utensils tape measure, chip signs, sign pockets, planograms, batteries, peg hooks, tools (e.g., screwdriver tape measure), tape, screws and/or other miscellaneous items as will be apparent to those of skill in the art upon reading the current specification. In one example, dividers 222, 252, and 282 facilitate separation and organization of different types and sizes of items 288 stored in the respective cavities 220, 250, 280, and/or 286.

Figure 8:
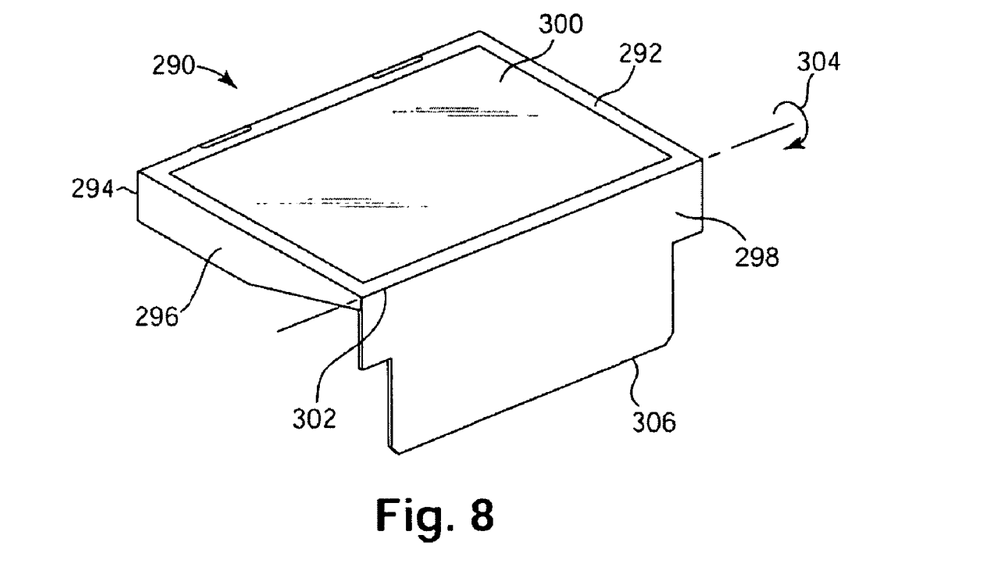
FIG. 8 is a rear perspective view illustration of a work surface unit of the utility cart assembly of FIG. 1, according to one embodiment of the present invention.

In one embodiment, utility cart assembly 10 includes an additional internal unit such as a work surface unit 290 as illustrated in FIG. 1 and, more specifically, in FIG. 8. In one example work surface unit 290 includes a top panel 292, a rear support wall 294, side support walls 296 and depending panel 298. In one embodiment, work surface unit 290 is substantially formed of a single blank of cardboard or other suitable material cut and folded to define work surface unit 290. Top panel 292 is substantially planar and, in one example, is substantially rectangular. Rear support wall 294 extends generally downwardly as illustrated from a rear, substantially linear edge of top panel 292. Side support walls 296 each extend downwardly from opposite side, substantially linear edges of top panel 292. Rear support wall 294 and side support walls 296 provide rigidity to top panel 292 such that a user can set items on or otherwise use top panel 292 as a panel for supporting such items, etc. In one example, a plastic, metal or other substantially planar surface member 300 is applied to a top surface of top panel 292 to further configure work surface unit 290 with a hard, planar writing surface. In one embodiment, surface member 300 is a planar piece of clear acrylic plastic.

In one example, a depending panel 298 extends downwardly from top panel 292 on a front edge or fold line 302 opposite rear support wall 294. Depending panel 298 is longer than rear support wall 294 and extends downwardly to define a lower edge 306 opposite top panel 292. Depending panel 298 is configured to fit within a cavity of another one of internal units, for example, within storage chamber 250 of second internal unit 202 just in behind of dividers 252 such that top panel 292 extends rearwardly from and substantially perpendicularly to depending panel 298 over first internal unit 200. In one embodiment, when so positioned with top panel 292 in a substantially horizontal orientation, rear support wall 294 extends over a collapsed child support seat portion 310 (generally indicated in FIG. 1) to selectively hold top panel 292 in place with sufficient support to serve as a work surface for maintaining work items such as a worksheet, notebook or similar sheet 312, a writing utensil 314 or other tool, sign, fixture, etc.

In one embodiment, top panel 292 is configured to rotate as generally indicated by arrow 304 about a rotational axis (e.g., fold line 302) to uncover and provide selective access to storage cavity 220 and any items 288 (FIG. 1) stored therein when work surface unit 290 is not being used as a support surface. In this manner, a working support surface can be provided without generally limiting the space in basket 24 that can be used for storage. In this manner, utility cart assembly 10 provides a comprehensive mobile work station including items for installation, tools for the installation, instructions and/or maps of the installation, designated storage spaces for all such items, and a work surface to aid the user in updating and/or installing signage in a retail center.

Figure 10:
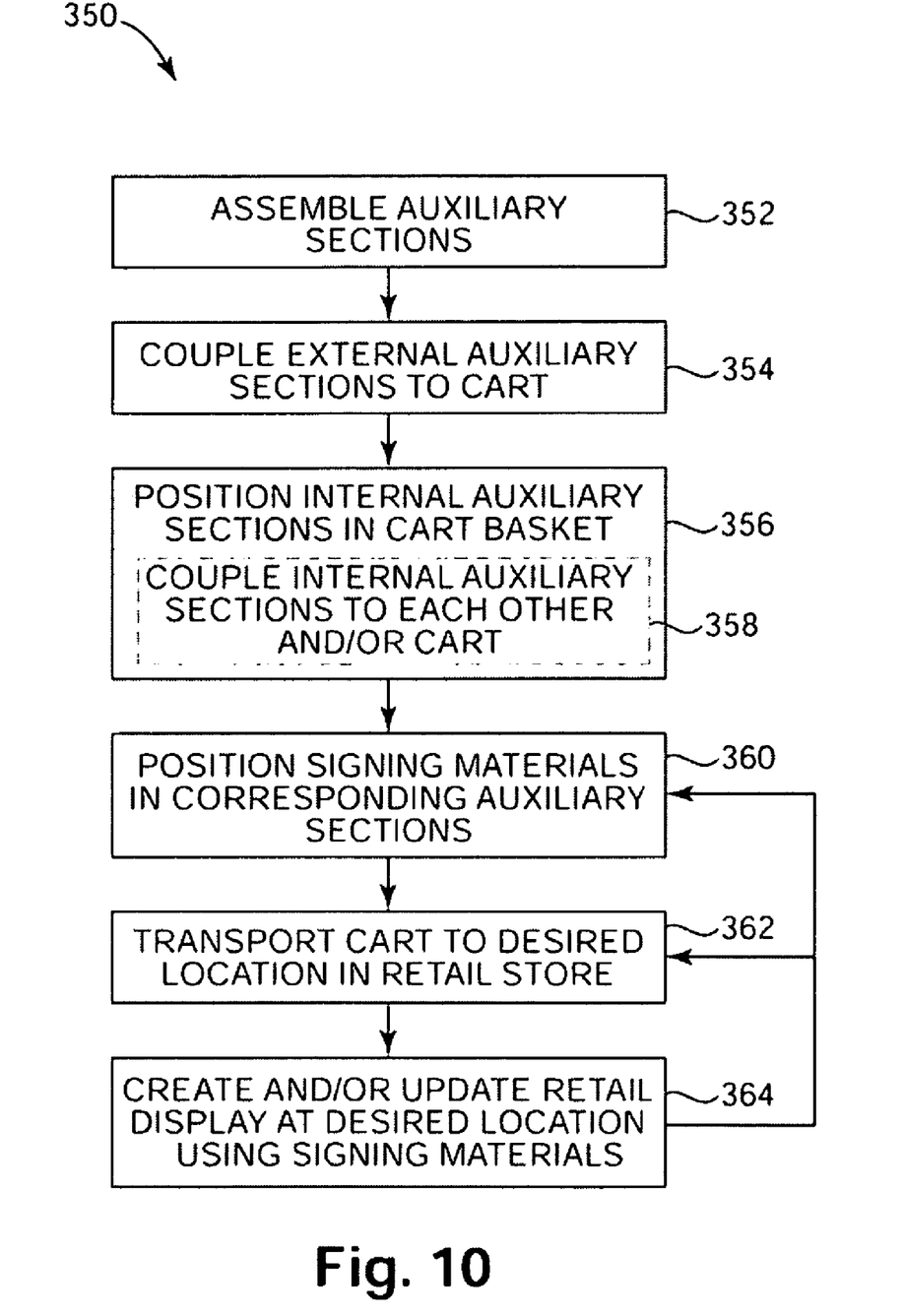
FIG. 10 is a flow chart illustration of a method of assembling and using a utility cart assembly, according to one embodiment of the present invention.

One example, method of assembly and using a utility cart assembly, for instance, utility cart assembly 10 is generally illustrated at 350. At 352, each of auxiliary units 14 is assembled, for example, is formed from a planar material such as cardboard. The plurality of auxiliary units 14 includes any one or more of first external unit 40, second external unit 42, third external unit 44, first internal unit 200, second internal unit 202, third internal unit 204, work surface unit 290, and any other suitable auxiliary unit or section, and assembly of each unit 14 in similar manners as described above.

At 354, any auxiliary units 14 configured to be positioned outside basket 24 are coupled with a shopping cart 12 provided, for example, from a stock of shopping carts 12 generally provided for consumer use within the retail setting. In one embodiment, external ones of auxiliary units 14 includes first external unit 40, second external unit 42, and third external unit 44, which are each positioned relative to basket 24 of shopping cart 12 as described above and are attached using coupling device 16, for example, a cable tie, such that each first external unit 40, second external unit 42, and third external unit 44, hangs from the outside of basket 24. In one example, coupling first external unit 40 positions external unit 40 such that top compartment opening 78, mid-compartment opening 98, and bottom compartment opening 114 face away from front panel 54 and basket 24.

In one embodiment, at 356, one or more of first internal unit 200, second internal unit 202, and third internal unit 204 are placed in basket 24, for example, with first internal unit 200 near basket rear wall 34, second internal unit 202 positioned just in front of first internal unit 200, and third internal unit 204 positioned in front of second internal unit 202. In one exampled, once positioned, top edges 218 and 248 of first and second internal units 200 and 202, respectively, each angle upwardly as they extend forwardly in basket 24 to create a tiered effect. In one example, positioning a portion of auxiliary units 14 in basket 24 includes coupling such units 14 to one another and/or to shopping cart 12 in any suitable manner. In one example, the portion of auxiliary units 14 in basket 24 are not coupled to one another and/or basket 24 other than being placed within storage area 28 of basket 24.

In one example, as part of step 356 and/or 358 work surface unit 290 is placed over first internal unit 200 and depending panel 298 of work surface unit 290 is slid into a rear portion of storage chamber 250 of second internal unit 202 behind any dividers 252. In this position, top panel 292 is rotatable about fold line 302 as described above to permit selectively access and covering of first internal unit 200 as will be apparent to those of skill in the art upon reading the present application.

Once auxiliary units 14 are secured to shopping cart 12, then, at 360, items related to the intended use of utility cart assembly 10, for example, items 138, 139, 190, 288, 312 and/or 314 are placed for storage in corresponding chambers of utility cart assembly 10. At 362, utility cart assembly 10 loaded with the desired items and is transported (i.e., easily rolled out) to the desired location in a retail establishment to replace or update signs used therein. Since all signs, tools, fixtures, etc. needed for the installation and/or update are included on utility cart assembly 10, the number of trips the user must make back and forth between the back or storage room of the retail establishment and the desired display location within the retail establishment can be greatly reduced. Reducing the number of such trips and preparation time in general decreases the number of man hours required to prepare for and completed a sign installation or update. Once utility cart assembly 10 is positioned at the display location, then, at 364, the retail display can be created and/or updated using the signing materials or other items maintained within and/or otherwise supported by utility cart assembly 10.

In view of the above, utility cart assembly 10 provides an organized apparatus for storing items related to a general use such as sign installation that is easily transported to the location of the sign installation or update. Accordingly, preparation for and the actual installation of signs in the retail establishment can be more efficiently completed. In addition, the utility cart assembly 10 provides a generally aesthetically pleasing means for maintaining the necessary signing items in a retail location that is neat in appearance and relatively compact so as not to overly disrupt consumers shopping experience in the associated retail establishment, which, in turn, contributes to a satisfactory shopping experience for the consumer.

Although the invention has been described to particular embodiments, such embodiments are for illustrative purposes only and should not be considered to limit the invention. For example, while the terms "compartment," "container," "chamber," and "cavity" are used to describe various features of the invention; such terms are substantially used as synonyms to one another throughout the above description. Various alternatives and modifications within the scope of the invention in its various embodiments will be apparent to those with ordinary skill in the art.

What is claimed is:

1. A utility cart assembly comprising:
a shopping cart including a basket and wheels positioned below the basket;
a storage unit coupled to and positioned substantially entirely outside the basket, the storage unit defining a first panel positioned adjacent the basket, a second panel opposite the first panel, and a compartment defined between the first panel and the second panel, wherein the second panel defines an opening, and the compartment is accessible through the opening; and
at least one coupling strap facilitating coupling of the storage unit to the basket;
wherein:
the basket defines a rear wall and a handle extending rearwardly from the rear wall, wherein the first panel is positioned adjacent and the storage unit extends over a substantial entirety of the rear wall,
the basket defines a sidewall extending forwardly away from the rear wall,
the utility cart assembly further comprising a side storage unit extending over a substantial entirety of the sidewall of the basket, and
the side storage unit defining a storage chamber open to a rear side of the side storage unit.

2. A utility cart assembly comprising:
a shopping cart including a basket and wheels positioned below the basket;
a storage unit coupled to and positioned substantially entirely outside the basket, the storage unit defining a first panel positioned adjacent the basket, a second panel opposite the first panel, and a compartment defined between the first panel and the second panel, wherein the second panel defines an opening, and the compartment is accessible through the opening;
at least one coupling strap facilitating coupling of the storage unit to the basket; and
a plurality of storage cartons each selectively maintained within the compartment, wherein each of the plurality of storage cartons is readily accessible and removable from the compartment through the opening;
wherein the first panel is a front panel having a first side substantially adjacent the basket and a second side opposite the first side and adjacent the compartment, and the utility cart assembly further defines:
a rear lip extending partially behind the compartment and spaced from the front panel, wherein each of the plurality of storage cartons are selectively and snugly maintained in the compartment between the rear lip and the front panel even during movement of the shopping cart.

3. A utility cart assembly comprising:
a shopping cart including a basket and wheels positioned below the basket;
a storage unit coupled to and positioned substantially entirely outside the basket, the storage unit defining a first panel positioned adjacent the basket, a second panel opposite the first panel, and a compartment defined between the first panel and the second panel, wherein the second panel defines an opening, and the compartment is accessible through the opening; and
at least one coupling strap facilitating coupling of the storage unit to the basket;
wherein the storage unit includes coupling flanges each extending away from the compartment in opposite directions, each of the coupling flanges defines at least one aperture, and each coupling strap extends through one aperture and through a portion of the basket to secure the storage unit to the basket.

4. A utility cart assembly comprising:
a shopping cart including a basket and wheels positioned below the basket;
a storage unit coupled to and positioned substantially entirely outside the basket, the storage unit defining a first panel positioned adjacent the basket, a second panel opposite the first panel, and a compartment defined between the first panel and the second panel, wherein the second panel defines an opening, and the compartment is accessible through the opening; and
at least one coupling strap facilitating coupling of the storage unit to the basket;
wherein the storage unit is a first storage unit defining a top wall, and the utility cart assembly further comprises:
a second storage unit placed on and supported by the top wall of the first storage unit, coupled to the shopping cart, positioned substantially outside the basket, and defining a second compartment open to a top side of the second storage unit facing away from the first storage unit.

5. A utility cart assembly comprising:
a shopping cart including a basket and wheels positioned below the basket;
a storage unit coupled to and positioned substantially entirely outside the basket, the storage unit defining a first panel positioned adjacent the basket, a second panel opposite the first panel, and a compartment defined between the first panel and the second panel, wherein the second panel defines an opening, and the compartment is accessible through the opening; and
at least one coupling strap facilitating coupling of the storage unit to the basket;
wherein:
the storage unit is an external storage unit,
the utility cart assembly further comprises one or more internal storage units positioned inside the basket and each defining a plurality of compartments for storing items,
the one or more internal storage units includes a first internal storage unit and a second internal storage unit,
the second internal storage unit defines a storage chamber,
each of the first internal storage unit and the second internal storage unit are positioned substantially within the basket adjacent one another, and
the utility cart assembly further comprises:
a work surface unit including a top panel and a depending tab coupled to the second storage unit within the storage chamber, wherein the top panel and the depending tab each border a rotational axis, and wherein the top panel is configured to rotate relative to the depending tab about the rotational axis.

6. The utility cart assembly of claim 5, wherein the rotational axis is positioned and the top panel is sized such that rotation of the top panel about the rotational axis selectively covers and uncovers the first internal storage unit, and the top panel extends substantially horizontally when the top panel covers the first internal storage unit.

7. A utility cart assembly comprising:
a shopping cart including a basket and wheels positioned below the basket;
an external storage unit coupled to and positioned substantially entirely outside the basket, the external storage unit defining a first panel positioned adjacent the basket, a second panel opposite the first panel, and a compartment defined between the first panel and the second panel, wherein the second panel defines an opening, and the compartment is accessible through the opening;
at least one coupling strap facilitating coupling of the external storage unit to the basket;
a first internal storage unit formed separately from the shopping cart and positioned within the basket, the first internal storage unit defining at least one storage chamber therein;
a second internal storage unit formed separately from the shopping cart and positioned within the basket adjacent the first internal storage unit, the second internal storage unit defining a least one storage cavity therein; and
an auxiliary section defining a substantially planar work surface and a depending tab extending away from the substantially planar work surface, wherein the substantially planar work surface and the depending tab each border opposite sides of a fold line defined by the auxiliary section;
wherein the depending tab of the auxiliary section extends at least partially into the at least one storage cavity, the substantially planar work surface extends substantially over the first internal storage unit when the substantially planar work surface is in a first position, and the substantially planar work surface is selectively and repeatedly rotatable about the fold line between the first position and a second position, the substantially planar work surface being positioned away from the first internal storage unit when the substantially planar work surface is in the second position such that a user can more easily access the first internal storage unit when the substantially planar work surface is in the second position.

8. The utility cart assembly of claim 7, wherein the basket defines a first end wall, a second end wall opposite the first end wall, and two sidewalls extending between the first end wall and the second end wall, the external storage unit is coupled with the first end wall, and the utility cart assembly further comprises:
a side storage unit extending over a substantial entirety of one of the two sidewalls of the basket, the side storage unit defining a storage area open toward the first end wall of the basket.

9. The utility cart assembly of claim 8, wherein the auxiliary section rotates toward the first end wall when rotated from the second position back to the first position, and the first internal storage unit is positioned nearer the first end wall than the second internal storage unit.

* * * * *